(12) United States Patent
Huang et al.

(10) Patent No.: US 8,314,352 B2
(45) Date of Patent: Nov. 20, 2012

(54) TWO-LEVEL PRESSURE SENSITIVE KEYBOARD

(75) Inventors: Bin-Hui Huang, Taipei (TW); Chien-Ming Yang, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 214 days.

(21) Appl. No.: 12/875,916

(22) Filed: Sep. 3, 2010

(65) Prior Publication Data

US 2012/0024682 A1    Feb. 2, 2012

(30) Foreign Application Priority Data

Jul. 30, 2010  (TW) ................................ 99125312 A (51) Int. Cl.
  *H01H 9/00*    (2006.01)

(52) U.S. Cl. ........................................ 200/1 B; 200/512
(58) Field of Classification Search .................. 200/1 B, 200/5 R, 18, 17 B, 341, 344, 345, 512, 517; 307/112, 113, 119; 341/22, 34
See application file for complete search history.

(56) References Cited

U.S. PATENT DOCUMENTS

| 3,917,917 A * | 11/1975 | Murata | 200/517 |
| 4,268,815 A * | 5/1981 | Eventoff et al. | 338/69 |
| 4,733,590 A * | 3/1988 | Watanabe | 200/5 A |
| 4,767,943 A * | 8/1988 | Adler et al. | 200/512 |
| 6,492,602 B2 * | 12/2002 | Asai et al. | 200/1 B |
| 6,999,009 B2 * | 2/2006 | Monney | 341/34 |

* cited by examiner

*Primary Examiner* — Felix O Figueroa
(74) *Attorney, Agent, or Firm* — Kirton McConkie; Evan R. Witt (57) ABSTRACT

A two-level pressure sensitive keyboard includes at least one key and a membrane switch circuit module. The membrane switch circuit module includes a first contact, a second contact, a first spacing layer for separating the first contact from the second contact, a third contact, a fourth contact, and a second spacing layer for separating the third contact from the fourth contact. The thickness of the second spacing layer is greater than that of the first spacing layer. When the key is depressed in response to the first pressure, the first contact and the second contact are electrically connected with each other to generate a first sensing signal. When the key is depressed in response to the second pressure, the first contact and the second contact are electrically connected with each other and the third contact and fourth contact are electrically connected with each other to generate a second sensing signal.

10 Claims, 9 Drawing Sheets

TWO-LEVEL PRESSURE SENSITIVE KEYBOARD

FIELD OF THE INVENTION

The present invention relates to a keyboard, and more particularly to a pressure sensitive keyboard having a pressure sensing function.

BACKGROUND OF THE INVENTION

Figure 1:
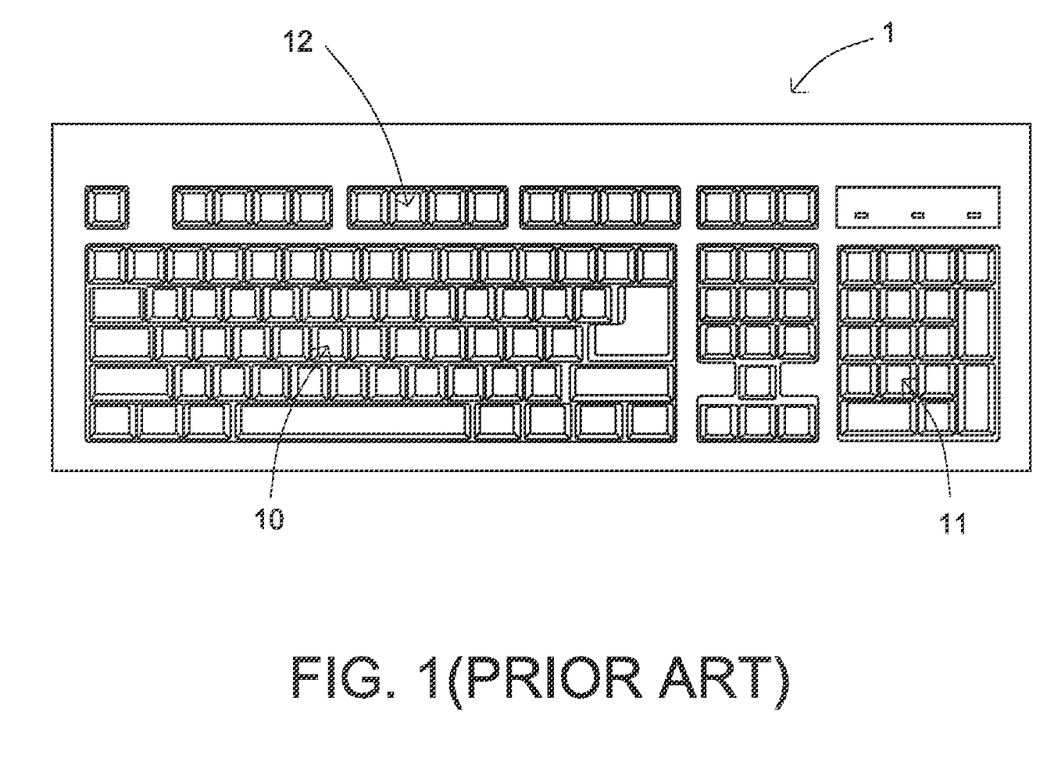
FIG. 1 is a schematic view illustrating the outward appearance of a computer keyboard according to the prior art.

As known, keyboards are indispensable input devices of various electronic devices such as computers, mobile phones, personal digital assistants (PDAs), or the like. FIG. 1 is a schematic view illustrating the outward appearance of a computer keyboard according to the prior art. The surface of the computer keyboard 1 includes plural keys. These keys include ordinary keys 10, numeric keys 11 and function keys 12. When one or more keys are depressed by the user, a corresponding signal is issued to the computer, and thus the computer executes a function corresponding to the depressed key or keys. For example, when the ordinary keys 10 are depressed, corresponding English letters or symbols are inputted into the computer system. In addition, the function keys 12 (F1~F12) can be programmed to cause corresponding application programs to provide certain functions.

With the maturity of computing technologies, the conventional keyboard 1 that has basic functions fails to meet the users' requirements. For this reason, the keyboard manufacturers make efforts in designing novel keyboards with diversified functions. Recently, a pressure sensitive keyboard having a pressure sensing function has been disclosed. In the pressure sensitive keyboard, a pressure sensing module is disposed under the plural keys for sensing the pressure exerted on the key that is depressed by the user. Generally, the pressure sensitive keyboard has a preset pressure value. In a case that the pressure exerted on the depressed key is lower than the preset pressure value, the pressure sensitive keyboard issues a lightly-depressed sensing signal. In response to the lightly-depressed sensing signal, the computer executes a lightly-depressed instruction. Whereas, in a case that the pressure exerted on the depressed key is higher than the preset pressure value, the pressure sensitive keyboard issues a heavily-depressed sensing signal. In response to the heavily-depressed sensing signal, the computer executes a heavily-depressed instruction. For example, in a case that a first pressure lower than the preset pressure value is exerted on the key A of the pressure sensitive keyboard, the computer executes a function of showing a small letter "a". Whereas, in a case that a second pressure higher than the preset pressure value is exerted on the key A of the pressure sensitive keyboard, the computer executes a function of showing a capital letter "A".

Figure 2:
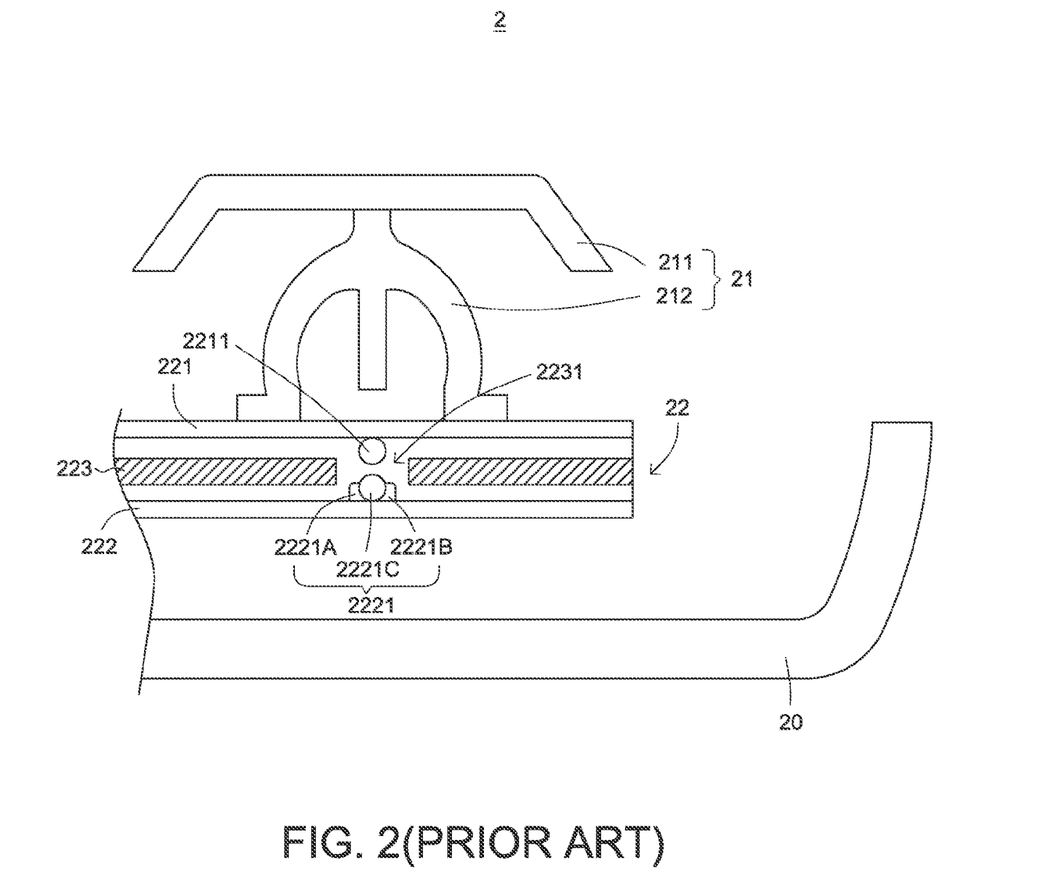
FIG. 2 is a schematic cross-sectional view illustrating a portion of a conventional pressure sensitive keyboard.

Hereinafter, the configurations and the operations of the conventional pressure sensitive keyboard will be illustrated with reference to FIG. 2. FIG. 2 is a schematic cross-sectional view illustrating a portion of a conventional pressure sensitive keyboard. As shown in FIG. 2, the conventional pressure sensitive keyboard 2 comprises a base 20, at least one key 21, a membrane switch circuit module 22 and a controlling unit (not shown). The key 21 is disposed over the base 20. The membrane switch circuit module 22 is arranged between the key 21 and the base 20. The key 21 comprises a keycap 211 and an elastic element 212. The keycap 211 is exposed outside the base 20 to be depressed by a user. As such, the keycap 211 is movable upwardly or downwardly with respect to the base 20. The elastic element 212 is disposed under the keycap 211. When the keycap 211 is depressed, an elastic force is accumulated in the elastic element 212, and the membrane switch circuit module 22 is depressed by the elastic element 212.

Please refer to FIG. 2 again. The membrane switch circuit module 22 is disposed under the key 21. The membrane switch circuit module 22 comprises a first-layer membrane circuit board 221, a second-layer membrane circuit board 222 and a spacing layer 223. The first-layer membrane circuit board 221 has a first contact 2211. The second-layer membrane circuit board 222 is disposed under the first-layer membrane circuit board 221. In addition, the second-layer membrane circuit board 222 has a second contact member 2221. The second contact member 2221 comprises a second left-side metallic contact 2221A, a second right-side metallic contact 2221B and a second graphite contact 2221C. The second graphite contact 2221C is arranged between the second left-side metallic contact 2221A and the second right-side metallic contact 2221B. The spacing layer 223 is arranged between the first-layer membrane circuit board 221 and the second-layer membrane circuit board 222. In addition, the spacing layer 223 has a perforation 2231. In the membrane switch circuit module 22, the first-layer membrane circuit board 221 and the second-layer membrane circuit board 222 are insulated from each other by the spacing layer 223. Due to the spacing layer 223, the first contact 2211 and the second contact member 2221 are separated and disconnected from each other if the keycap 211 is not depressed. The controlling unit may judge the strength of the pressure exerted on the depressed key 21. In addition, the controlling unit has a preset threshold voltage value corresponding to the preset pressure value.

In a case that the key 21 is depressed by the user with a first pressure lower than the preset pressure value, the keycap 211 is moved downwardly with respect to the base 20 to depress the elastic element 212, and thus an elastic force is accumulated in the elastic element 213. At the same time, the membrane switch circuit module 22 is depressed by the elastic element 212 and bent downwardly. In the membrane switch circuit module 22, the first-layer membrane circuit board 221 and the spacing layer 223 are moved downwardly and toward the second-layer membrane circuit board 222. In addition, the first contact 2211 of the first-layer membrane circuit board 221 is inserted into the perforation 2231, and then contacted with the second contact member 2221 of the second-layer membrane circuit board 222 to result in electrical connection. Since the strength of the first pressure is relatively smaller, the contact area between the first contact 2211 and the second graphite contact 2221C of the second contact member 2221 is relatively smaller. Due to the electrical connection between the first contact 2211 and the second contact member 2221, a first pressure-strength sensing voltage that is relatively lower is generated. By comparing the first pressure-strength sensing voltage with the preset threshold voltage value, the controlling unit may realize that the first pressure-strength sensing voltage is lower than the preset threshold voltage value. As a consequence, the controlling unit generates a lightly-depressed sensing signal indicative of a low magnitude of the first pressure. Whereas, when the keycap 211 is released and no longer depressed by the user, the compressed elastic element 212 is restored to the original shape and the elastic force is relieved. In this situation, the elastic element 212 is sustained against the keycap 211, and thus the keycap 211 is moved upwardly with respect to the base 20 and returned to the original position where no pressure is applied thereon.

Whereas, in a case that the key 21 is depressed by the user with a second pressure higher than the preset pressure value, the keycap 211 is moved downwardly with respect to the base 20 to depress the membrane switch circuit module 22, and thus the membrane switch circuit module 22 is bent and moved downwardly. In the membrane switch circuit module 22, the first-layer membrane circuit board 221 and the spacing layer 223 are moved downwardly and toward the second-layer membrane circuit board 222. In addition, the first contact 2211 of the first-layer membrane circuit board 221 is inserted into the perforation 2231, and then contacted with the second contact member 2221 of the second-layer membrane circuit board 222 to result in electrical connection. Since the strength of the first pressure is relatively larger, the contact area between the first contact 2211 and the second graphite contact 2221C of the second contact member 2221 is relatively larger. Due to the electrical connection between the first contact 2211 and the second contact member 2221, a second pressure-strength sensing voltage that is relatively larger is generated. By comparing the second pressure-strength sensing voltage with the preset threshold voltage value, the controlling unit may realize that the second pressure-strength sensing voltage is higher than the preset threshold voltage value. As a consequence, the controlling unit generates a heavily-depressed sensing signal indicative of a high magnitude of the second pressure. When the keycap 211 is released and no longer depressed by the user, the key 21 is returned to the original position. The operations of the conventional pressure sensitive keyboard have been described above.

During the operations of the conventional pressure sensitive keyboard, the pressure-strength sensing voltage is generated according to the contact area between the first contact 2211 and the second graphite contact 2221C of the second contact member 2221. After the pressure-strength sensing voltage is compared with the preset threshold voltage value by the controlling unit, the magnitude of the pressure exerted on the depressed key is realized. Generally, it takes a computing time for the controlling unit to judge the magnitude of the pressure exerted on the depressed key. In other words, the process of judging the magnitude of the pressure exerted on the depressed key wastes the computer's resources. Therefore, there is a need of providing a pressure sensitive keyboard without performing complex computation.

SUMMARY OF THE INVENTION

The present invention provides a tow-level pressure sensitive keyboard without the need of performing complex computation.

In accordance with an aspect of the present invention, there is provided a two-level pressure sensitive keyboard. The two-level pressure sensitive keyboard includes a base, at least one key and a membrane switch circuit module. The key is depressed in response to a first pressure or a second pressure. The membrane switch circuit module is disposed over the base and under the key. When the key is depressed to push the membrane switch circuit module, a lightly-depressed sensing signal or a heavily-depressed sensing signal is generated. The membrane switch circuit module includes a first-layer membrane circuit board, a first spacing layer, a second-layer membrane circuit board, a second spacing layer and a third-layer membrane circuit board. The first-layer membrane circuit board has a first contact corresponding to the key. The first spacing layer is disposed under the first-layer membrane circuit board, and has a first perforation. In addition, the first spacing layer has a first thickness. The second-layer membrane circuit board is disposed under the first spacing layer, and has a second contact and a third contact. The second contact is formed on a first surface of the second-layer membrane circuit board. The third contact is formed on a second surface of the second-layer membrane circuit board and electrically connected with the second contact. When the key is depressed in response to the first pressure, the second contact is inserted into the first perforation to be contacted with the first contact, so that the lightly-depressed sensing signal is generated. The second spacing layer is disposed under the second-layer membrane circuit board, and has a second perforation. In addition, the second spacing layer has a second thickness. The third-layer membrane circuit board is disposed under the second spacing layer, and has a fourth contact. When the key is depressed in response to the second pressure, the fourth contact is inserted into the second perforation to be contacted with the third contact, so that the heavily-depressed sensing signal is generated. The first thickness and the second thickness are different.

In an embodiment, the first thickness is smaller than the second thickness. In addition, a ratio of the second thickness to the first thickness is ranged between 1.1 and 2.

In an embodiment, the diameter of the first perforation is equal to that of the second perforation.

In an embodiment, the first contact, the second contact, the third contact and the fourth contact are made of low-impedance material.

In an embodiment, the key includes a keycap, a connecting member and an elastic element. When the keycap is depressed, the keycap is moved upwardly and downwardly with respect to the base. The connecting member is connected with the keycap, so that the keycap is movable upwardly or downwardly with respect to the base. The elastic element is disposed under the keycap. When the keycap is depressed and moved downwardly with respect to the base, an elastic force is accumulated in the elastic element. Whereas, when the keycap is released, the elastic force is applied on the keycap, so that the keycap is moved upwardly with respect to the base.

In an embodiment, the first-layer membrane circuit board includes plural scan input lines, the first contact is connected with a first scan input line of the plural scan input lines, the second-layer membrane circuit board includes plural scan output lines, and the second contact and the third contact are connected with a first scan output line of the plural scan output lines. The plural scan output lines and the plural scan input lines crisscross to define a first-layer keyboard scanning matrix corresponding to the plural keys.

In an embodiment, the two-level pressure sensitive keyboard further includes a controlling unit, which is connected with the membrane switch circuit module for judging which key is depressed according to plural scan output lines and the plural scan input lines, or judging whether the third contact and the fourth contact are electrically connected with each other. When the key is depressed and the first contact and the second contact are electrically connected with each other, the controlling unit issues a key code corresponding to the depressed key according to the first scan input line connected with the first contact and the first scan output line connected with the second contact.

In an embodiment, the two-level pressure sensitive keyboard further includes a prompt module, which is disposed between the key and the base and connected with the controlling unit. When the controlling units judges that the third contact and the fourth contact are electrically connected with each other, the prompt module issues a prompt message.

In an embodiment, the prompt module is an illumination module, and the prompt message is a light beam emitted by the illumination module.

In an embodiment, the prompt module is a buzzer, and the prompt message is a warning sound emitted by the buzzer.

In an embodiment, the first spacing layer and the second spacing layer are respectively printed on the first-layer membrane circuit board and the second-layer membrane circuit board.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 3:
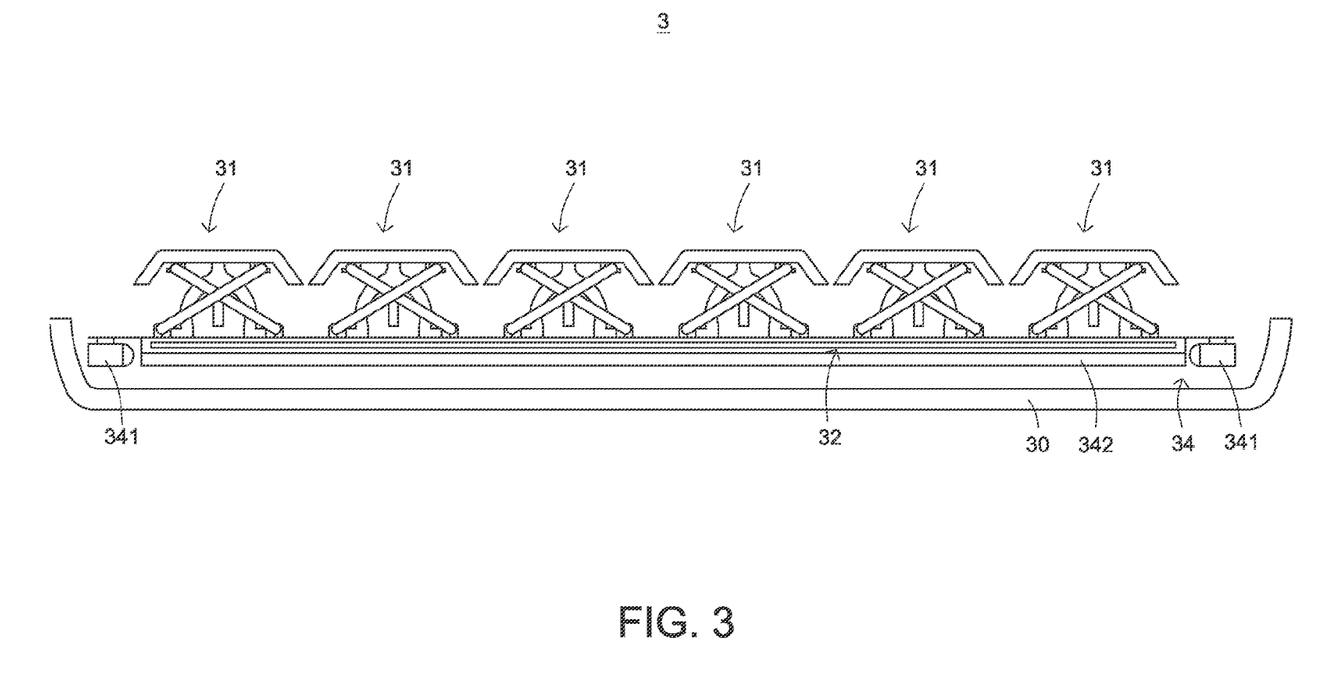
FIG. 3 is a schematic cross-sectional view illustrating a two-level pressure sensitive keyboard according to an embodiment of the present invention.

For obviating the drawbacks encountered from the prior art, the present invention provides a two-level pressure sensitive keyboard. FIG. 3 is a schematic cross-sectional view illustrating a two-level pressure sensitive keyboard according to an embodiment of the present invention. As shown in FIG. 3, the two-level pressure sensitive keyboard 3 comprises a base 30, plural keys 31, a membrane switch circuit module 32, a controlling unit 33 (see FIG. 5) and a prompt module 34. In this embodiment, the prompt module 34 is an illumination module. The illumination module 34 comprises plural light emitting diodes (LEDs) 341 and a light guide plate 342. The plural light emitting diodes 341 are respectively arranged at bilateral sides of the plural keys 31 for emitting light beams. For clarification and brevity, only two light emitting diodes 341 are shown in the drawings. The light guide plate 342 is laminated with the membrane switch circuit module 32, and disposed under the membrane switch circuit module 32. The light guide plate 342 is used for changing the emerging directions of the light beams, so that the two-level pressure sensitive keyboard 3 has luminous efficacy.

Figure 4:
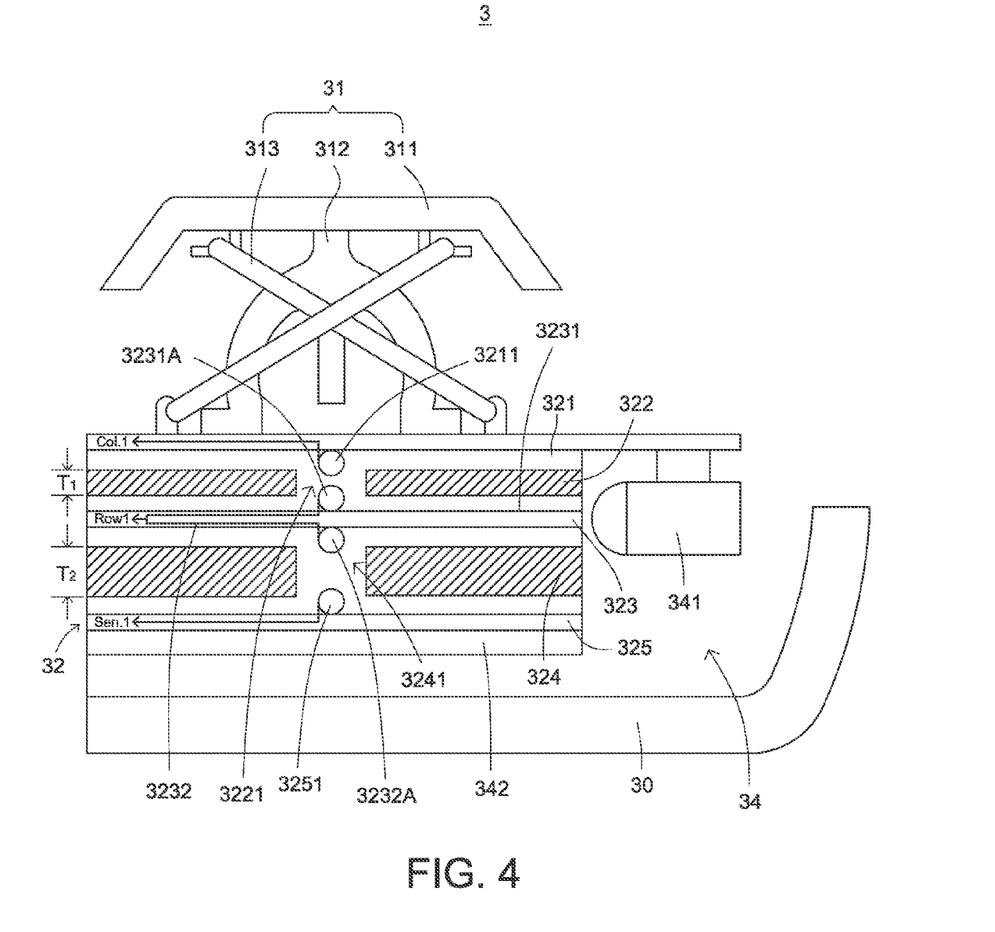
FIG. 4 is a schematic cross-sectional view illustrating a key of a two-level pressure sensitive keyboard according to an embodiment of the present invention.

Hereinafter, the structures of the keys 31 of the two-level pressure sensitive keyboard of the present invention will be illustrated by referring to a rightmost key 31. FIG. 4 is a schematic cross-sectional view illustrating a key of a two-level pressure sensitive keyboard according to an embodiment of the present invention. The key 31 is exposed outside the base 30. The key 31 comprises a keycap 311, an elastic element 312 and a connecting member 313. The keycap 311 is exposed outside the base 30 to be depressed by a user. When the keycap 311 is depressed, a sensing signal corresponding to the depressed key 31 is generated. The keycap 311 may be made of translucent or transparent material, so that the keycap 311 is light-transmissible. The elastic element 312 is disposed under the keycap 311. When the keycap 311 is depressed by the user and moved downwardly with respect to the base 30, an elastic force is accumulated in the elastic element 312. Whereas, when the keycap 311 is released and no longer depressed by the user, the elastic force is applied on the keycap 311 to cause the keycap 311 to move upwardly with respect to the base, so that the keycap 311 is returned to the original position where no pressure is applied thereon. The connecting member 313 is connected with the keycap 311, so that the keycap 311 is movable upwardly or downwardly with respect to the base 30. In this embodiment, the elastic element 312 is made of rubbery material, and the connecting member 313 is a scissors-type connecting member.

The structures of the membrane switch circuit module 32 will be illustrated as follows. The membrane switch circuit module 32 is disposed above the base 30 and under the key 31. In response to a pressure exerted on the key 31, the depressed key 31 is sustained on the membrane switch circuit module 32, and thus a corresponding sensing signal is generated. The membrane switch circuit module 32 comprises a first-layer membrane circuit board 321, a first spacing layer 322, a second-layer membrane circuit board 323, a second spacing layer 324 and a third-layer membrane circuit board 325. The first-layer membrane circuit board 321 has a first contact 3211 corresponding to the key 31. The first spacing layer 322 is disposed under the first-layer membrane circuit board 321. The first spacing layer 322 has a first perforation 3221. In addition, the first perforation 3221 is aligned with the first contact 3211. The first spacing layer 322 has a first thickness T1. The second-layer membrane circuit board 323 is disposed under the first spacing layer 322. The second-layer membrane circuit board 323 has a second contact 3231A and a third contact 3232A. The second contact 3231A is formed on a first surface 3231 of the second-layer membrane circuit board 323. In addition, the second contact 3231A is aligned with the first perforation 3221. The third contact 3232A is formed on a second surface 3232 of the second-layer membrane circuit board 323. In addition, the third contact 3232A is aligned with the second contact 3231A. The second contact 3231A and the third contact 3232A are electrically connected with each other.

In the membrane switch circuit module 32, the second spacing layer 324 is disposed under the second-layer membrane circuit board 323. The second spacing layer 324 comprises a second perforation 3241. The second perforation 3241 is aligned with the third contact 3232A. In addition, the second spacing layer 324 has a second thickness T2. The first thickness T1 of the first spacing layer 322 and the second thickness T2 of the second spacing layer 324 are different. In this embodiment, the first thickness T1 is smaller than the second thickness T2. For example, a ratio of the second thickness T2 to the first thickness T1 is 1.5. The third-layer membrane circuit board 325 is disposed under the second spacing layer 324. The third-layer membrane circuit board 325 has a fourth contact 3251. In addition, the fourth contact 3251 is aligned with the second perforation 3241. As shown in FIG. 4, the diameter of the first perforation 3221 and the diameter of the second perforation 3241 are equal. In an embodiment, the first contact 3211, the second contact 3231A, the third contact 3232A and the fourth contact 3251 are made of low-impedance material. An example of the low-impedance material includes but is not limited to metallic material or silver paste.

Figure 5:
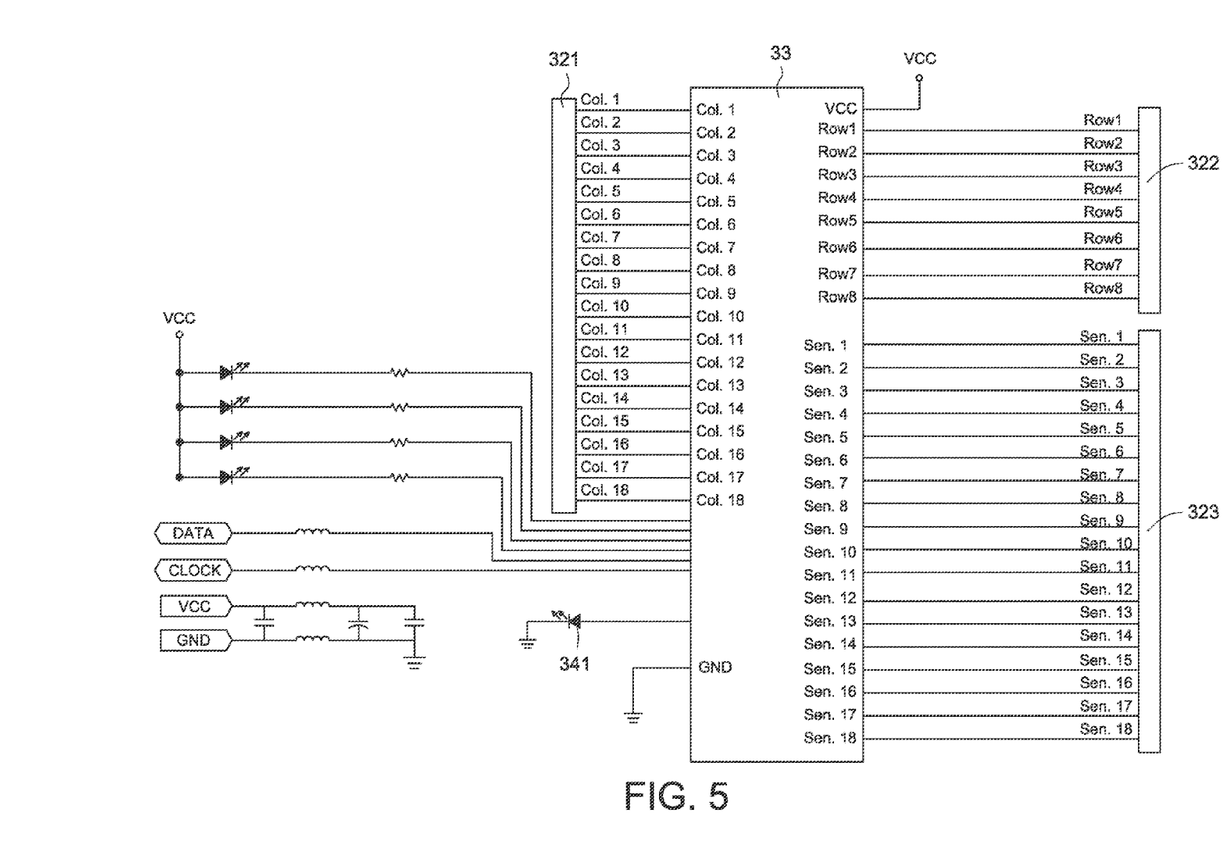
FIG. 5 is a schematic circuit diagram illustrating the internal circuitry of a two-level pressure sensitive keyboard according to an embodiment of the present invention.

FIG. 5 is a schematic circuit diagram illustrating the internal circuitry of a two-level pressure sensitive keyboard according to an embodiment of the present invention. Hereinafter, the internal circuitry of the two-level pressure sensitive keyboard 3 will be illustrated with reference to FIGS. 4 and 5. In the membrane switch circuit module 32, the first-layer membrane circuit board 321 comprises plural scan input lines Col.1~Col.18. Each of the scan input lines has a corresponding first contact 3211. The second-layer membrane circuit board 323 comprises plural scan output lines Row1~Row8. Each of the scan output lines has a corresponding second contact 3231A. The third-layer membrane circuit board 325 comprises plural detecting lines Sen.1~Sen.18. Each of the detecting lines has a corresponding fourth contact 3251. As shown in FIG. 4, corresponding to the key 31, the first contact 3211 is connected with the scan input line Col.1 of the first-layer membrane circuit board 321, and the second contact 3231A is connected with the scan output line Row1 of the second-layer membrane circuit board 323. In addition, the third contact 3232A is electrically connected with the second contact 3231A, so that the third contact 3232A is also connected with the scan output line Row1 (see FIG. 4). The plural scan output lines Row1~Row8 and the plural scan input lines Col.1~Col.18 are respectively connected with the controlling unit 33. In addition, the fourth contact 3251 of the third-layer membrane circuit board 325 is connected with the detecting line Sen.1 (see FIG. 4), and the detecting line Sen.1 is connected with the controlling unit 33. In a case that one of the plural scan output lines Row1~Row8 and one of the plural scan input lines Col.1~Col.18 are electrically connected with each other, the controlling unit 33 may judge which key is depressed. At the same time, the controlling unit 33 issues a key code corresponding to the depressed key. Moreover, in a case that one of plural scan output lines Row1~Row8 and one of the plural detecting lines Sen.1~Sen.18 are electrically connected with each other, the controlling unit 33 may judge whether the third contact 3232A and the fourth contact 3251 corresponding to the depressed key are electrically connected with each other. In this embodiment, the controlling unit 33 is a microprocessor.

Figure 6:
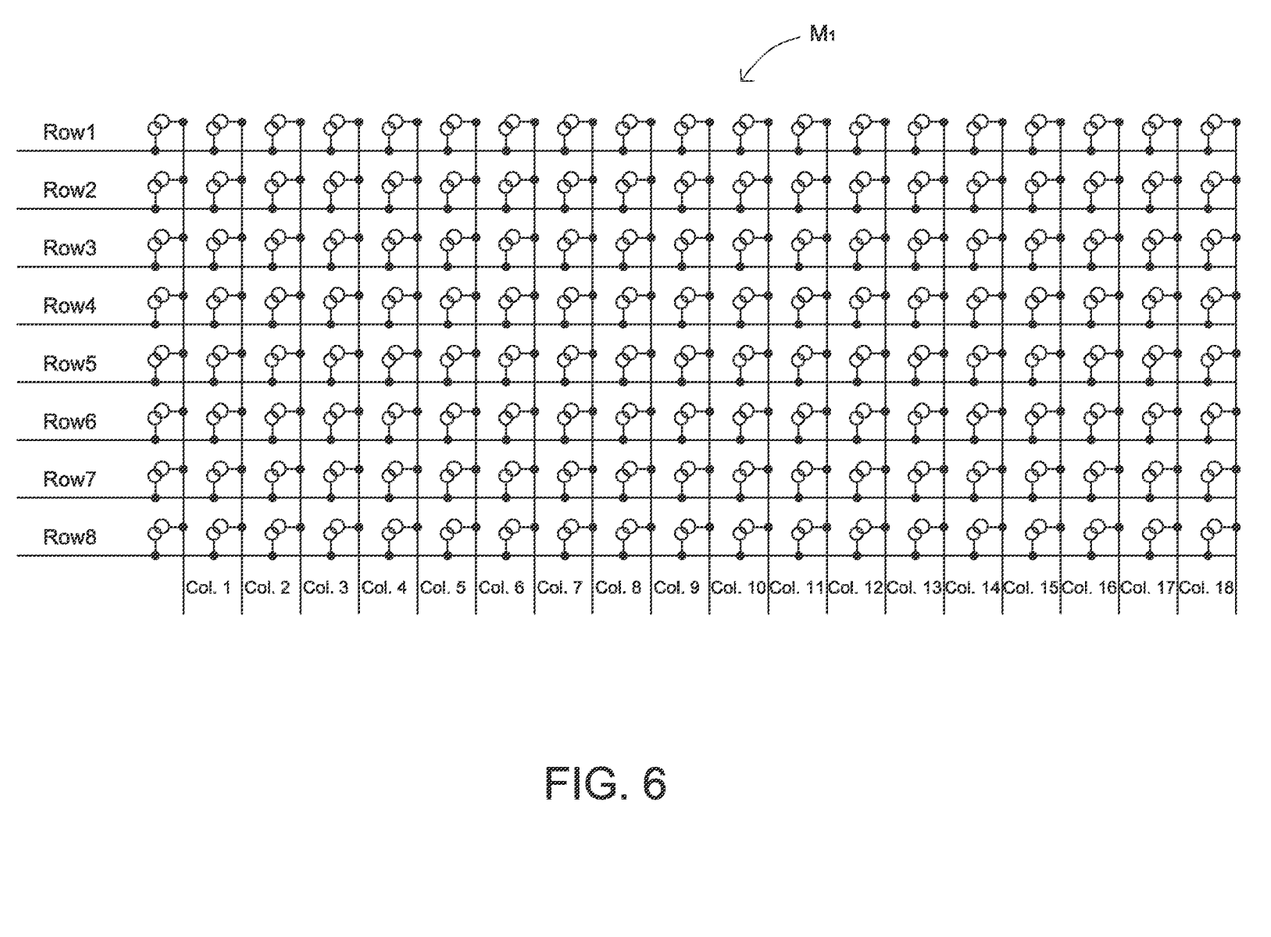
FIG. 6 is a schematic circuit diagram illustrating a first-layer keyboard scanning matrix of a two-level pressure sensitive keyboard according to an embodiment of the present invention.
Figure 7:
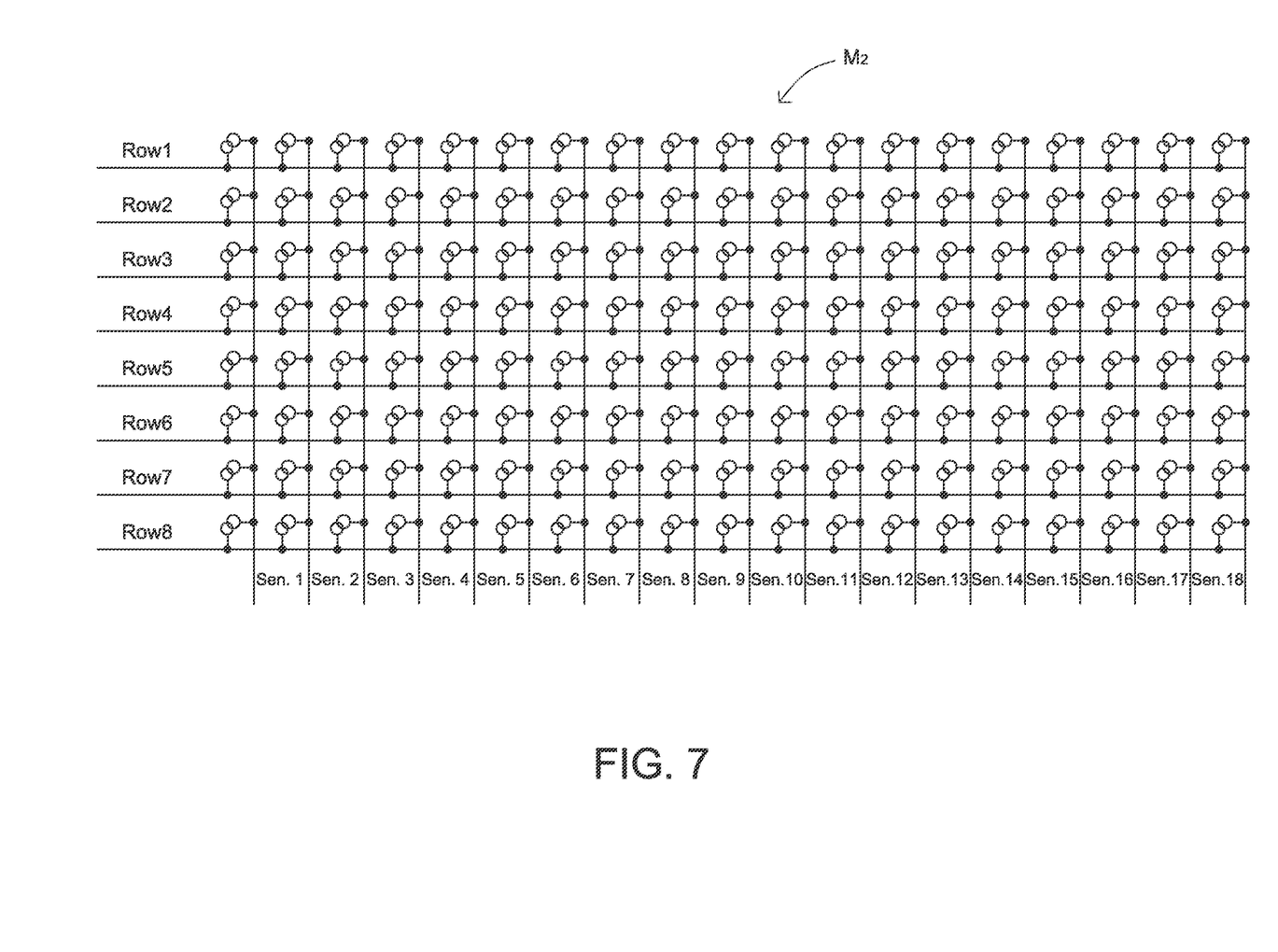
FIG. 7 is a schematic circuit diagram illustrating a second-layer keyboard scanning matrix of a two-level pressure sensitive keyboard according to an embodiment of the present invention.

FIG. 6 is a schematic circuit diagram illustrating a first-layer keyboard scanning matrix of a two-level pressure sensitive keyboard according to an embodiment of the present invention. FIG. 7 is a schematic circuit diagram illustrating a second-layer keyboard scanning matrix of a two-level pressure sensitive keyboard according to an embodiment of the present invention. Please refer to FIGS. 6 and 7. The plural scan output lines Row1~Row8 and the plural scan input lines Col.1~Col.18 crisscross to define a first-layer keyboard scanning matrix M1 corresponding to the plural keys 31 (see FIG. 6). The plural scan output lines Row1~Row8 and the plural detecting lines Sen.1~Sen.18 crisscross to define a second-layer keyboard scanning matrix M2 corresponding to the plural keys 31 (see FIG. 7). The first-layer keyboard scanning matrix M1 and the second-layer keyboard scanning matrix M2 are stacked with each other to define a keyboard scanning matrix (not shown).

Figure 8:
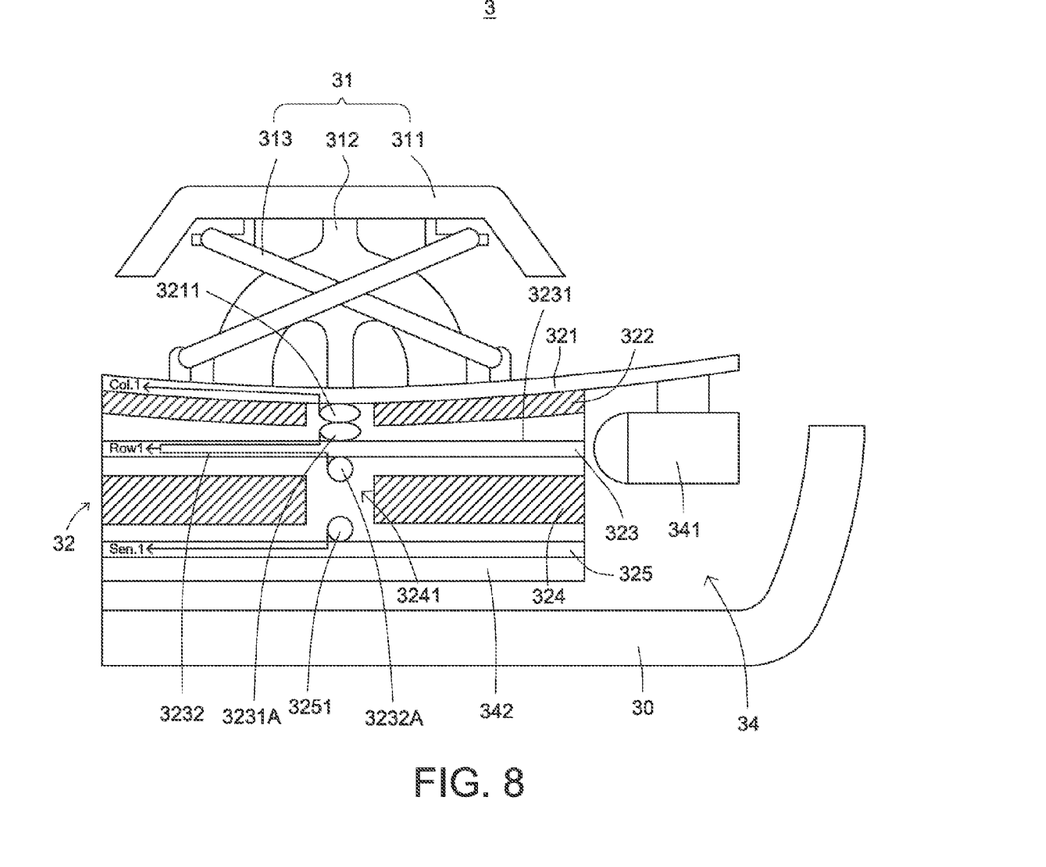
FIG. 8 is a schematic cross-sectional view illustrating a lightly-depressed key of a two-level pressure sensitive keyboard according to an embodiment of the present invention.

FIG. 8 is a schematic cross-sectional view illustrating a lightly-depressed key of a two-level pressure sensitive keyboard according to an embodiment of the present invention. Please refer to FIGS. 4 and 8. In a case that the key 31 is not depressed by the user (see FIG. 4), the first-layer membrane circuit board 321 and the second-layer membrane circuit board 323 by the first spacing layer 322, so that the first contact 3211 and the second contact 3231A are separated from each other. In addition, the second-layer membrane circuit board 323 and the third-layer membrane circuit board 325 are separated from each other by the second spacing layer 324, so that the third contact 3232A and fourth contact 3251 are separated from each other. When the keycap 311 of the key 31 is depressed in response to a first pressure F1 that is relatively weaker, the keycap 311 is moved downwardly with respect to the base 30 through the connecting member 313. At the same time, the elastic element 312 is compressed by the keycap 311 to depress the first-layer membrane circuit board 321. As a consequence, the first-layer membrane circuit board 321 and the first spacing layer 322 are bent downwardly, and the first contact 3211 is inserted into the perforation 3221 and contacted with the second contact 3231A (see FIG. 8) to result in electrical connection. In response to the electrical connection between the first contact 3211 and the second contact 3231A, the control unit 33 issues a lightly-depressed sensing signal. For example, the lightly-depressed sensing signal is a high logic level signal. Whereas, when the key 31 is no longer depressed by the user, the compressed elastic element 312 is restored to the original shape and the elastic force is relieved. In this situation, the elastic element 312 is sustained against the keycap 311, and thus the keycap 311 is moved upwardly with respect to the base 30 and returned to the original position where no pressure is applied thereon.

Figure 9:
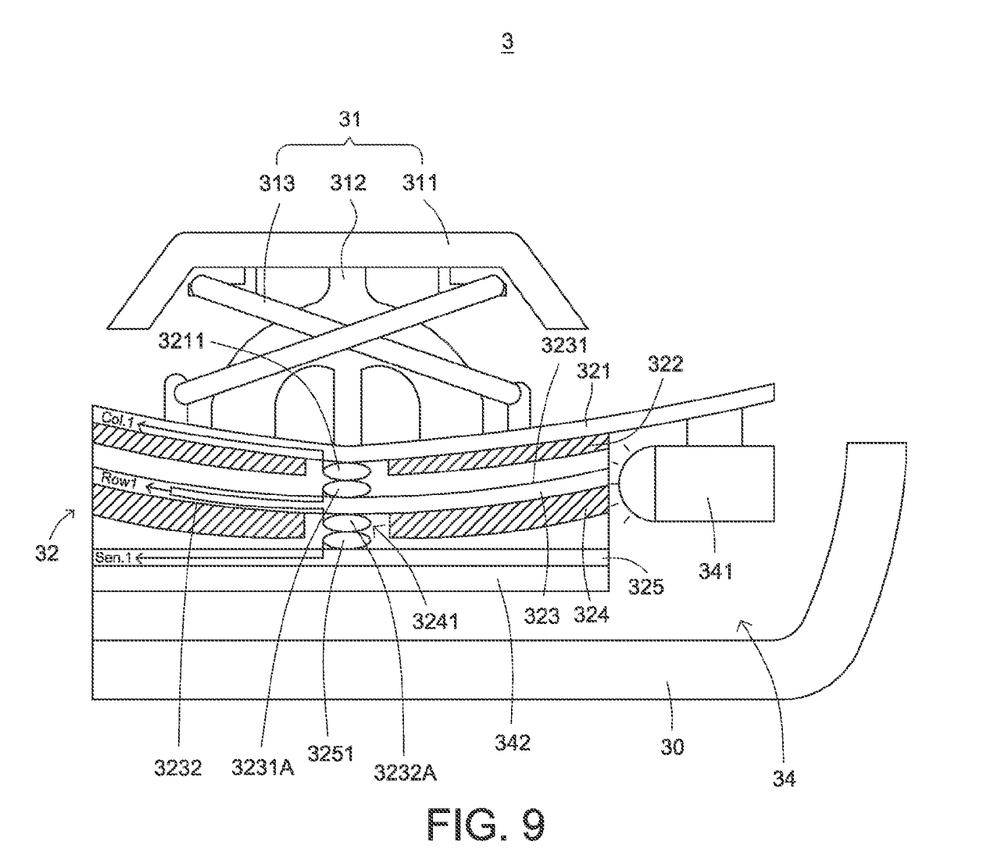
FIG. 9 is a schematic cross-sectional view illustrating a heavily-depressed key of a two-level pressure sensitive keyboard according to an embodiment of the present invention.

FIG. 9 is a schematic cross-sectional view illustrating a heavily-depressed key of a two-level pressure sensitive keyboard according to an embodiment of the present invention. Please refer to FIGS. 4 and 9. In a case that the key 31 is not depressed by the user (see FIG. 4), the first contact 3211 and the second contact 3231A are separated from each other, and the third contact 3232A and fourth contact 3251 are separated from each other. When the keycap 311 of the key 31 is depressed in response to a second pressure F2 that is relatively stronger, the keycap 311 is moved downwardly with respect to the base 30 through the connecting member 313. At the same time, the elastic element 312 is compressed by the keycap 311 to depress the first-layer membrane circuit board 321. As a consequence, the first-layer membrane circuit board 321 and the first spacing layer 322 are bent downwardly, and the first contact 3211 is inserted into the perforation 3221 and contacted with the second contact 3231A to result in electrical connection. In response to the electrical connection between the first contact 3211 and the second contact 3231A, the control unit 33 issues a lightly-depressed sensing signal. Moreover, in response to the second pressure F2, the second-layer membrane circuit board 323 is also bent. As a consequence, the third contact 3232A of the second-layer membrane circuit board 323 is inserted into the second perforation 3241 and contacted with the fourth contact 3251 to result in electrical connection. In response to the electrical connection between the third contact 3232A and the fourth contact 3251, the control unit 33 issues a heavily-depressed sensing signal. For example, the heavily-depressed sensing signal is a high logic level signal.

In response to the heavily-depressed sensing signal issued from the control unit 33, the plural light emitting diodes 341 of the illumination module 34 emit light beams. The emerging directions of the light beams are changed by the light guide plate 342, so that the two-level pressure sensitive keyboard 3 has luminous efficacy. In this situation, the light beams are served as prompt messages to prompt the user that the heavily-depressed sensing signal has been generated by the two-level pressure sensitive keyboard 3. Similarly, when the key 31 is no longer depressed by the user, the keycap 311, the elastic element 312 and the connecting member 313 are returned to their original positions. For example, the two-level pressure sensitive keyboard 3 is in communication with a computer (not shown). If the key 31 is to be depressed is the key A, the first scan input line Col.1 and the first scan output line Row1 crisscross to define an intersection point corresponding to the key A. In response to the lightly-depressed sensing signal issued from the control unit 33 to the computer, the computer executes a function of showing a small letter "a". Whereas, in response to the heavily-depressed sensing signal issued from the control unit 33 to the computer, the computer executes a function of showing a capital letter "A". At the same time, the two-level pressure sensitive keyboard 3 has luminous efficacy.

It is noted that the two-level pressure sensitive keyboard 3 of the present invention may provide a two-level switch by the three layers of membrane circuit boards 321, 323 and 325. When the key 31 is slightly depressed in response to the first pressure F1, only the first contact 3211 and the second contact 3231A are triggered to generate the lightly-depressed sensing signal for executing a first function. Whereas, when the key 31 is heavily depressed in response to the second pressure F2, the first contact 3211 and the second contact 3231A are triggered and the third contact 3232A and the fourth contact 3251 are also triggered to generate the heavily-depressed sensing signal for executing a second function.

In the above embodiments, the two-level pressure sensitive keyboard 3 of the present invention has a membrane switch circuit module 32 with a thinner first spacing layer 322 and a thicker second spacing layer 324. As a consequence, the first contact 3211 and the second contact 3231A are triggered in response to the weaker first pressure F1, and the third contact 3232A and the fourth contact 3251 are triggered in response to the stronger second pressure F2. In other words, as the ratio of the second thickness T2 of the second spacing layer 324 to the first thickness T1 of the first spacing layer 322 is increased, the strength of the second pressure F2 for triggering the third contact 3232A and the fourth contact 3251 should be increased in order to distinguish the second pressure F2 from the first pressure F1. For example, the ratio of the second thickness T2 to the first thickness T1 is 1.5. However, the ratio of the second thickness T2 to the first thickness T1 is not restricted to be 1.5. In the two-level pressure sensitive keyboard 3 of the present invention, it is preferred that the ratio of the second thickness T2 to the first thickness T1 is ranged between 1.1 and 2.

Moreover, there are two approaches of forming the first spacing layer 322 and the second spacing layer 324. In the first approach, the first spacing layer 322 having the structure similar to the first-layer membrane circuit board 321 is provided, and then sandwiched between the first-layer membrane circuit board 321 and the second-layer membrane circuit board 323; and the second spacing layer 324 is produced in the same way. In the second approach, a printing article layer is firstly formed on the first-layer membrane circuit board 321 to define the first spacing layer 322, and then the first spacing layer 322 is sandwiched between the first-layer membrane circuit board 321 and the second-layer membrane circuit board 323; and the second spacing layer 324 is produced in the same way.

In the above embodiment, the prompt module 34 of the two-level pressure sensitive keyboard 3 of the present invention is illustrated by referring to the illumination module. Nevertheless, a buzzer or a vibration module may be used as the prompt module 34. In a case that the prompt module 34 is a buzzer, the prompt message in response to the heavily-depressed sensing signal is a warning sound emitted by the buzzer. Whereas, in a case that the prompt module 34 is a vibration module, the prompt message in response to the heavily-depressed sensing signal is a vibration prompt issued by the vibration module.

From the above description, the two-level pressure sensitive keyboard of the present invention may provide a two-level digital switch by the three layers of membrane circuit boards. In comparison with the conventional pressure sensitive keyboard, the two-level pressure sensitive keyboard of the present invention does not need to perform the complex computation. As a consequence, the time of performing the complex computation and the computer's resources are saved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A two-level pressure sensitive keyboard, comprising:
   a base;
   at least one key to be depressed in response to a first pressure or a second pressure; and
   a membrane switch circuit module disposed over said base and under said key, wherein when said key is depressed to push said membrane switch circuit module, a lightly-depressed sensing signal or a heavily-depressed sensing signal is generated, wherein said membrane switch circuit module comprises:
      a first-layer membrane circuit board having a first contact corresponding to said key;
      a first spacing layer disposed under said first-layer membrane circuit board, and having a first perforation, wherein said first spacing layer has a first thickness;
      a second-layer membrane circuit board disposed under said first spacing layer, and having a second contact and a third contact, wherein said second contact is formed on a first surface of said second-layer membrane circuit board, and said third contact is formed on a second surface of said second-layer membrane circuit board and electrically connected with said second contact, wherein when said key is depressed in response to said first pressure, said second contact is inserted into said first perforation to be contacted with said first contact, so that said lightly-depressed sensing signal is generated;
      a second spacing layer disposed under said second-layer membrane circuit board, and having a second perforation, wherein said second spacing layer has a second thickness; and
      a third-layer membrane circuit board disposed under said second spacing layer, and having a fourth contact, wherein when said key is depressed in response to said second pressure, said fourth contact is inserted into said second perforation to be contacted with said third contact, so that said heavily-depressed sensing signal is generated, wherein said first thickness and said second thickness are different,
   wherein said first-layer membrane circuit board comprises plural scan input lines, said first contact is connected with a first scan input line of said plural scan input lines, said second-layer membrane circuit board comprises plural scan output lines, and said second contact and said third contact are connected with a first scan output line of said plural scan output lines, wherein said plural scan output lines and said plural scan input lines crisscross to define a first-layer keyboard scanning matrix corresponding to said plural keys.

2. The two-level pressure sensitive keyboard according to claim 1 wherein said first thickness is smaller than said second thickness, and a ratio of said second thickness to said first thickness is ranged between 1.1:1 and 2:1.

3. The two-level pressure sensitive keyboard according to claim 1 wherein the diameter of said first perforation is equal to that of said second perforation.

4. The two-level pressure sensitive keyboard according to claim 1 wherein said first contact, said second contact, said third contact and said fourth contact are made of low-impedance material.

5. The two-level pressure sensitive keyboard according to claim 1 wherein said key comprises:
- a keycap, wherein when said keycap is depressed, said keycap is moved upwardly and downwardly with respect to said base;
- a connecting member connected with said keycap, so that said keycap is movable upwardly or downwardly with respect to said base; and
- an elastic element disposed under said keycap, wherein when said keycap is depressed and moved downwardly with respect to said base, an elastic force is accumulated in said elastic element, wherein when said keycap is released, said elastic force is applied on said keycap, so that said keycap is moved upwardly with respect to said base.

6. The two-level pressure sensitive keyboard according to claim 1 further comprising a controlling unit, which is connected with said membrane switch circuit module for judging which key is depressed according to plural scan output lines and said plural scan input lines, or judging whether said third contact and said fourth contact are electrically connected with each other, wherein when said key is depressed and said first contact and said second contact are electrically connected with each other, said controlling unit issues a key code corresponding to said depressed key according to said first scan input line connected with said first contact and said first scan output line connected with said second contact.

7. The two-level pressure sensitive keyboard according to claim 6 further comprising a prompt module, which is disposed between said key and said base and connected with said controlling unit, wherein when said controlling units judges that said third contact and said fourth contact are electrically connected with each other, said prompt module issues a prompt message.

8. The two-level pressure sensitive keyboard according to claim 7 wherein said prompt module is an illumination module, and said prompt message is a light beam emitted by said illumination module.

9. The two-level pressure sensitive keyboard according to claim 7 wherein said prompt module is a buzzer, and said prompt message is a warning sound emitted by said buzzer.

10. The two-level pressure sensitive keyboard according to claim 1 wherein said first spacing layer and said second spacing layer are respectively printed on said first-layer membrane circuit board and said second-layer membrane circuit board.

* * * * *